Patented Feb. 17, 1931

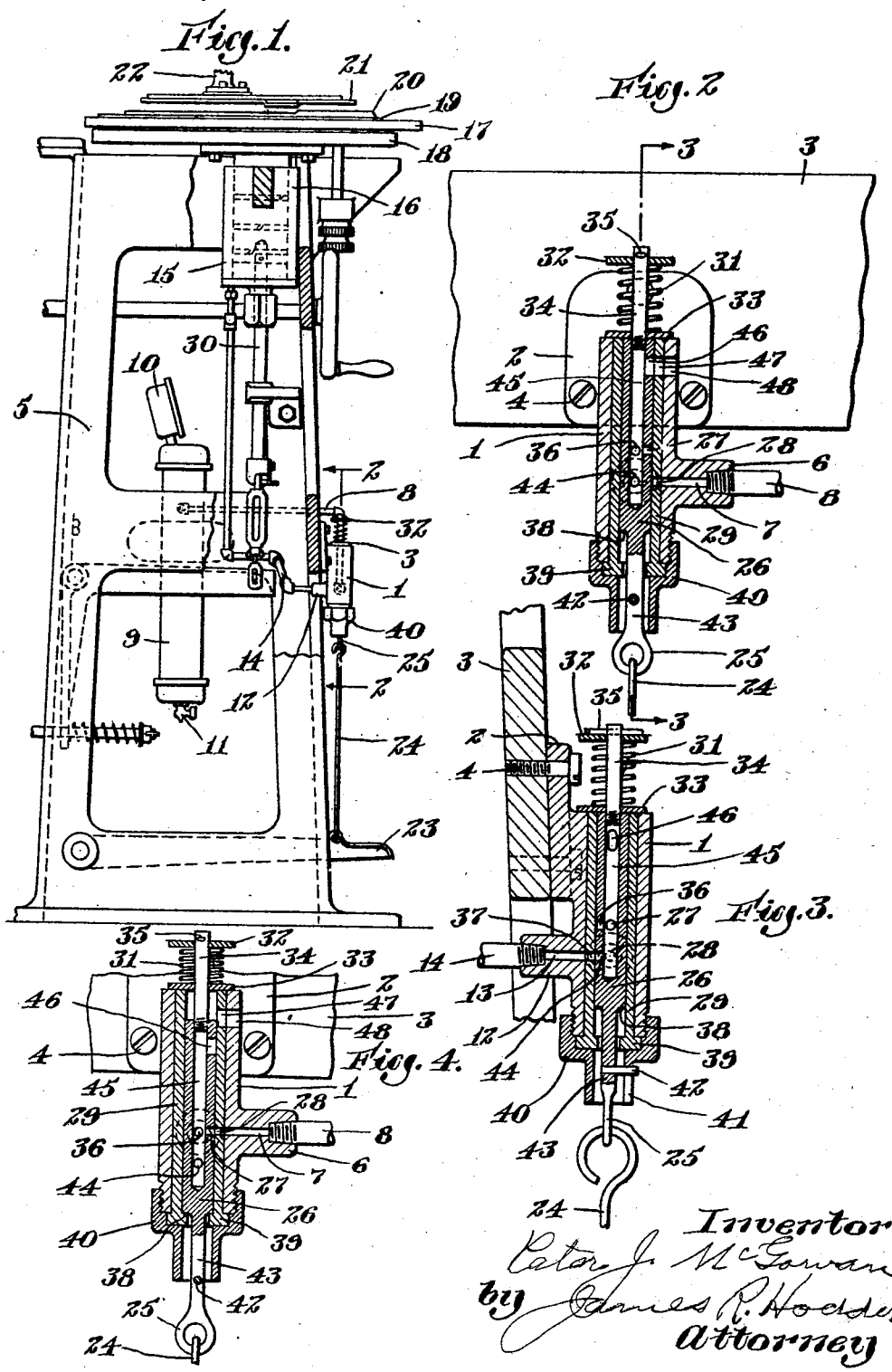
Feb. 17, 1931. P. J. McGOWAN 1,793,331
VALVE
Filed June 16, 1928

1,793,331

UNITED STATES PATENT OFFICE

PETER J. McGOWAN, OF HYDE PARK, MASSACHUSETTS, ASSIGNOR TO WELLMAN COMPANY, OF MEDFORD, MASSACHUSETTS, A CORPORATION OF MAINE

VALVE

Application filed June 16, 1928. Serial No. 285,828.

My present invention relates to valves, and more particularly to such valves adapted for use in the air control mechanism of the sole cutting machine illustrated and described in my prior application Ser. No. 108,212, filed May 11, 1926, (Patent No. 1,645,441, Oct. 11, 1927) and reference is hereby made to said patent for a complete disclosure of said machine, of which the present valve is to be a part.

A principal object of my present invention is to simplify and perfect the operation of such valves, to eliminate all rubber, leather or other non-metallic parts, thereby obviating the difficulties caused thereby.

A further object of my present invention is to produce a valve which will be efficient in action, positive in operation, and directly controlled by the operator.

In carrying out my present novel invention, I provide a valve which is extremely simple and economical of construction, comprising a valve body having a fixed sleeve therein. An exhaust port passes through both the valve body and sleeve, and the valve is normally held in exhausted position by means of spring controlled mechanism. An inlet port passes through the valve body and sleeve, and a second port passes through the valve body and sleeve leading to the air controlled piston and cylinder of the machine. A hollow slide valve having ports therein to aline, at predetermined periods, with the ports in the valve body and sleeve, is provided, having a sliding fit in the sleeve. The valve being normally in closed or exhausted position, a port in the valve is in alinement with the exhaust port in the sleeve and body permitting complete discharge or exhaust of all the air in the cylinder and pipe lines leading thereto, and assuring positive positioning of the piston and worktable, connected thereto, in its lowermost position. When it is desired to raise the piston and worktable, the single foot treadle of the machine is depressed, said foot treadle being directly connected to the sliding valve, and pulls same downwardly against the tension of a spring. When the valve is in its lowermost position, in which it is positively stopped, ports in said valve aline with the inlet port in the valve body and sleeve, permitting entrance of the air pressure to the interior of the sliding valve. Simultaneously, a port in said sliding valve is alined with the port leading to the air line connecting the valve to the cylinder, and permits a direct flow of air pressure to said cylinder, the exhaust ports having been closed or disalined by downward movement of the valve. Upon completion of the cutting operation of the machine, the foot treadle is released, permitting the valve to be drawn upwardly by its spring controlled means, closing the inlet port, and opening the exhaust ports, means being provided to limit the upward movement of the valve to proper position and alinement of the ports. Simultaneously with the alining of the exhaust ports, a further port in the sliding valve is alined with the port leading to the cylinder, whereupon the air discharges or exhausts from the cylinder and air line through the exhaust ports to the open air.

I have devised a valve which is constructed entirely of metal, with a minimum of moving parts, positive in action and efficient in operation, simple of construction and economical of manufacture, and as I believe that such a valve is novel, I claim the same broadly herein.

Further features of the invention, details of construction, advantages and novel combinations of parts, will be hereinafter more fully pointed out and claimed.

Referring to the drawings, illustrating a preferred embodiment of my invention,

Fig. 1 is a side elevation, in fragmentary detail, of the sole cutting machine of my said prior application, with my present valve attached thereto;

Fig. 2 is a cross-sectional view on the line 2—2 of Fig. 1;

Fig. 3 is a cross-sectional view on the line 3—3 of Fig. 2; and

Fig. 4 is a cross-sectional view illustrating the valve in open, or air-admitting position.

As shown in the drawings, my present novel valve comprises a metallic valve body 1 having a plate 2 preferably integral there-with. This plate 2 is attached to the crossbar or member 3 of the sole cutting machine by screws or the like 4. The sole cutting machine is designated generally at 5, a full description of said machine not being necessary herein, as the constructional details are the same as set forth in my said prior application, my present invention residing in the valve itself and its application to the machine. On the valve body 1 is a boss 6 having an intake aperture or port 7 therein. A pipe line 8 leading from a suitable source of air under pressure is connected to the boss 6. This pipe line 8 runs from a chamber 9 having a pressure gauge 10 to indicate the pressure being carried through the line 8, and a pet cock 11 for cleaning said chamber. A second boss 12 is provided on the body 1, having a port 13 leading, through the air line 14, to the cylinder 15. Within the cylinder 15 is an air-actuated piston 16 connected to a vertically reciprocable worktable 17 through the medium of an auxiliary table 18. On table 17, in preparation for the sole cutting operation, is a cutting sheet 19, to protect the cutting knife from injury against the metallic worktable. On the cutting sheet 19 is placed the material 20, from which the sole is to be cut. Spaced above the material to be cut is a form 21, the contour of which the cutting knife will follow during the cutting operation. The form 21 is removably attached to the arm 22. The worktable 17 is illustrated in lowered or depressed position, with the cutting sheet 19 and material 20 ready to be raised, on the worktable, against the form 21, spaced thereabove. When it is desired to carry out the cutting operation, the single foot treadle 23 is depressed by the foot of the operator, pulling downwardly the wire or rod 24, detachably connected to a loop or ring 25 on the end of the slide valve 26. Such downward movement of the slide valve 26 will bring the working parts of the valve into the position illustrated in Fig. 4, with the intake port 27 in alinement with the port 28 in the sleeve 29, permitting the entrance of air through the port 7 in the boss 6. There now being no other exit from the interior of the slide valve 29 except through the port 36 in the sliding valve, port 37 in the sleeve, and port 13 in the boss 12, the air passes therethrough, through the pipe line 14 to the cylinder 15, raising the piston 16 and with it the auxiliary table 18 and worktable 17, together with the materials to be cut thereon, against the form 21. The ports 28 and 37 in the sleeve are angularly disposed with relation to each other. Simultaneously with the raising of the piston 16, the piston tail rod 30 rises, actuating, through a series of links and levers, mechanism to operate the knife and cutting mechanism of the machine. This mechanism, however, being fully described in my said prior application, and my present invention residing primarily in the valve, I have not herein illustrated or described the further operating parts of this machine in detail.

It will be noted, from an inspection of Fig. 4, that the slide valve has been depressed, against the tension of a coiled spring 31 confined between two plates or washers 32, 33, which washers are slidably mounted on a rod or shaft 34 threaded into the top of the slide valve 26. A pin 35 keeps the washers and spring in place. The sliding valve 26 is limited against downward movement by its shoulder 38 striking against the inner rim of the head 39 of the sleeve 29, and when in this lowermost position, the inlet ports 27 and 28 are in alinement, as well as the ports 36 and 37, permitting free entrance of the air to the cylinder 15. The sleeve 29 is held in place in the body 1 by means of a nut or threaded cap 40 attached to the body 1. This nut member or cap 40 has a slot 41 in which slides a pin or stop 42 in the tail shaft or rod 43 of the sliding valve, limiting the upward movement of the sliding valve when pressure is released from the foot treadle 23, the coiled spring 31 raising the valve to exhausted position, whereupon the inlet ports 36 and 27 are disalined from the ports 37 and 28 respectively, thus preventing the entrance of further air to the pipe line 14 and cylinder 15. When the sliding valve 26 has reached its uppermost position, determined by the stop pin 42 in the slot 41, a port 44 in the slide valve 26 is brought into alinement with the port 37 in the sleeve, permitting the air in the cylinder to enter the interior chamber 45 of the slide valve 26. Simultaneously an exhaust port 46 is brought into alinement with a port 47 in the sleeve 29 and a port 48 in the valve body 1, permitting exhausting of the air from the cylinder 15, through the pipe line 14, through the ports 13, 37, 44, 46, 47 and 48, to the open air, whereupon the pressure in the cylinder 15 being released, the piston 16, auxiliary table 18 and worktable 17 will lower or drop, leaving the material 20 and cutting sheet 19 free to be removed and new material inserted for another cutting operation.

The operation of my novel valve will be readily understood. Air under pressure being constantly in the air line 8, and the sliding valve being normally in exhausted position, as illustrated in Figs. 1, 2 and 3, and it being desired to raise the worktable to perform the cutting operation, the operator depresses the foot treadle 23, pulling the sliding valve 26 downwardly, by means of the wire or rod 24, against the tension of the coiled spring 31. The valve reaching its lowermost position, determined by the abutting of the shoulder 38 against the inner rim of the head 39 of the sleeve 29, the inlet port 27 in the sliding valve is brought into alinement with the ports 28 and 7, admitting air to the interior of the sliding valve. The port 36 is simultaneously brought into alinement with the ports 37 and 13, permitting such air under pressure to enter the pipe line 14, thence to the cylinder 15, raising the air-controlled piston and the tables and material carried thereby. Upon completion of the cutting operation and release of the pressure on the foot treadle, the coiled spring 31 will return the sliding valve 26 to its normal exhausted position, alining the ports 37, 44, 46, 47 and 48 and permitting exhausting of the air to the outside of the valve, simultaneously closing or disalining the inlet ports.

It will thus be seen that I have produced a novel valve, positive in its operation, economical to manufacture, simple in operation and construction because it has a minimum of moving parts, and long-lived because of the all-metallic construction of same. I believe that such a valve, constructed and arranged as above described, is novel, and I therefore claim the same broadly herein.

While I have necessarily described my invention somewhat in detail, it will be appreciated that I am not limited thereto, but may vary the size, shape, and arrangement of parts within reasonably wide limits without departing from the spirit of the invention.

My invention is further described and defined in the form of claims as follows:

1. A valve of the kind described, comprising a casing, a sleeve in said casing, a valve slidable in said sleeve, a sleeve retaining member fixed to said casing, said member having a slot therein, and a pin on said valve slidable in said slot to limit the movement of said sliding valve in one direction.

2. A valve of the kind described, comprising a casing, a sleeve in said casing, a valve slidable in said sleeve, a sleeve retaining member fixed to said casing, said member having a slot therein, a pin on said valve slidable in said slot to limit the movement of said sliding valve in one direction, an inturned flange at one end of said sleeve, said valve having a reduced stem thereon, and a shoulder on said valve adapted to engage said inturned flange on said sleeve to limit the movement of said valve in the other direction.

3. A valve of the kind described, comprising a sleeve having an inlet port and an outlet port angularly disposed with relation to each other, and a hollow valve slidable in said sleeve and having a port adapted to be registered with said inlet port and having a plurality of ports adapted to be alternately registered with said outlet port when said inlet-valve port is in open and closed position respectively, said sleeve also having an exhaust port remote from said inlet port, and said valve having a port adapted to register with said exhaust port after the inlet port is closed.

4. A valve of the kind described, comprising a sleeve having an inlet port and an outlet port angularly disposed with relation to each other, and a hollow valve slidable in said sleeve and having a port adapted to be registered with said inlet port and having a plurality of alined ports adapted to be alternately registered with said outlet port when said inlet port is in open and closed position respectively, said sleeve also having an exhaust port remote from said inlet port, and said valve having a port adapted to register with said exhaust port after the inlet port is closed.

5. A valve of the kind described, comprising a sleeve having an inlet port and an outlet port angularly disposed with relation to each other, and a hollow valve slidable in said sleeve and having a port adapted to be registered with said inlet port and having a plurality of alined ports angularly disposed with relation to said inlet port and adapted to be alternately registered with said outlet port when said inlet port is in open and closed position respectively, said sleeve also having an exhaust port remote from said inlet port, and said valve having a port adapted to register with said exhaust port after the inlet port is closed.

6. A valve of the kind described, comprising a casing, a sleeve in said casing having an inlet port and an outlet port angularly disposed with relation to each other, a hollow valve slidable in said sleeve and having a port adapted to be registered with said inlet port and having a plurality of ports adapted to be alternately registered with said outlet port when said inlet valve port is in open and closed position respectively, said sleeve also having an exhaust port remote from said inlet port, said valve also having a port adapted to register with said exhaust port after the inlet port is closed, a sleeve retaining member fixed to said casing and having a slot adjacent to one end thereof, a stem projecting from said valve, and a pin extending laterally from said stem, said pin being slidable in said slot to limit movement of said valve in one direction.

7. A valve of the kind described, comprising a sleeve having an inlet port and an outlet port angularly disposed with relation to each other, a hollow valve slidable in said sleeve and having a pair of ports adapted to simultaneously register with said inlet and outlet ports, said sleeve having an exhaust port remote from said inlet and outlet ports, and said valve having ports adapted to be simultaneously registered with said outlet and said exhaust ports after the inlet port is closed.

8. A valve of the kind described, comprising a casing, a sleeve in said casing having an inlet port and an outlet port angularly disposed with relation to each other, a hollow valve slidable in said sleeve and having a pair of ports adapted to simultaneously register with said inlet and outlet ports, said sleeve having an exhaust port remote from said inlet and outlet ports, said valve having ports adapted to be simultaneously registered with said outlet and said exhaust ports after the inlet port is closed, a sleeve retaining member fixed to said casing and having a slot adjacent to one end thereof, a stem projecting from said valve, and a pin extending laterally from said stem, said pin being slidable in said slot to limit the movement of said valve in one direction.

9. A valve of the kind described, comprising a casing, a sleeve in said casing, a valve slidable in said sleeve, a sleeve retaining member fixed to said casing, said member having a slot therein, a pin on said valve slidable in said slot to limit the movement of said sliding valve in one direction, an inturned flange at one end of said sleeve, said valve having a reduced stem thereon, and a shoulder on said valve adapted to engage said inturned flange on said sleeve to limit the movement of said valve in the other direction, said slot being of such length that said pin will constantly engage said slot to prevent rotation of said valve within said sleeve.

In testimony whereof, I have signed my name to this specification.

PETER J. McGOWAN.